United States Patent
Cheng et al.

(10) Patent No.: US 9,449,224 B2
(45) Date of Patent: Sep. 20, 2016

(54) METHOD, ELECTRONIC APPARATUS, AND COMPUTER-READABLE MEDIUM FOR RECOGNIZING PRINTED MAP

(71) Applicant: HTC Corporation, Taoyuan County (TW)

(72) Inventors: Chueh-Min Cheng, Taoyuan County (TW); Yung-Lung Chang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 288 days.

(21) Appl. No.: 13/865,988

(22) Filed: Apr. 18, 2013

(65) Prior Publication Data

US 2014/0314282 A1    Oct. 23, 2014

(51) Int. Cl.
*G06K 9/00* (2006.01)
(52) U.S. Cl.
CPC ................................. *G06K 9/00476* (2013.01)
(58) Field of Classification Search
None
See application file for complete search history.

(56) References Cited

U.S. PATENT DOCUMENTS

| | | | | |
|---|---|---|---|---|
| 8,164,599 B1* | 4/2012 | Kadous et al. | ............... | 345/634 |
| 8,331,958 B2* | 12/2012 | Hein | .................... | G01C 21/20 455/456.1 |
| 8,818,706 B1* | 8/2014 | Ogale et al. | ................. | 701/409 |
| 2008/0186255 A1* | 8/2008 | Cohen | ................. | G02B 27/017 345/8 |
| 2008/0233981 A1* | 9/2008 | Ismail | .................... | H04L 51/20 455/466 |
| 2011/0013014 A1* | 1/2011 | Wassingbo | ....... | G01C 21/3614 348/113 |
| 2012/0273968 A1* | 11/2012 | Liao et al. | ................... | 257/774 |

* cited by examiner

*Primary Examiner* — Nancy Bitar
(74) *Attorney, Agent, or Firm* — Jianq Chyun IP Office (57) ABSTRACT

A method for recognizing a printed map and an electronic apparatus using the same are provided. The method comprises the following steps. First, a picture of the printed map is obtained, and a block area surrounded by a road outline in the picture is defined. Next, at least one road name related to the road outline is recognized, and a map service is queried with the at least one recognized road name to find an electronic map having a map area corresponded to the block area in the map service. Afterwards, the block area in the picture is mapped to the map area in the map service.

18 Claims, 7 Drawing Sheets

METHOD, ELECTRONIC APPARATUS, AND COMPUTER-READABLE MEDIUM FOR RECOGNIZING PRINTED MAP

BACKGROUND

1. Field of the Invention

The application relates to a recognizing method, and in particular, to a method and an electronic apparatus for recognizing a printed map.

2. Description of Related Art

In modern societies, people get more and more chances to travel. In the journey of travels, the map plays an important role when visit a scenic area since it provides a variety of useful information to tourists. However, sometimes the printed map provided in the scenic area may be illustrated in a rough way, which makes some details of the map be neglected. Hence, when the user is reading the information in the map, the user may be confused, and even get lost.

SUMMARY

Accordingly, the present application is directed to a method, an electronic apparatus, and a computer readable medium for recognizing a printed map, through which contents of the printed map could be mapped to a more detailed map for providing more detailed information to the user.

A method for recognizing a printed map is introduced herein. The method may be adapted to an electronic apparatus. The method comprises the following steps. Firstly, a picture of the printed map is obtained, and a block area surrounded by a road outline in the picture is defined. Next, at least one road name related to the road outline is recognized, and a map service is queried with the at least one recognized road name to find an electronic map having a map area corresponded to the block area in the map service. Afterwards, the block area in the picture is mapped to the map area in the map service.

In an example of the application, the step of obtaining a picture of the printed map includes capturing the picture of the printed map with an image capturing unit.

In an example of the application, the step of obtaining a picture of the map comprises retrieving the picture of the printed map from a photo gallery.

In an example of the application, the step of defining the block area surrounded by the road outline in the picture comprises: performing an edge detection on the picture to detect the road outline, and adopting a picture area surrounded by the road outline as the block area.

In an example of the application, the step of recognizing the at least one road name related to the road outline comprises: performing an optical character recognition (OCR) on at least one character around the road outline to obtain the at least one road name.

In an example of the application, the step of querying the map service with the at least one recognized road name to find the region corresponded to the block area in the map service comprises: querying the map service with the at least one recognized road name to find the electronic map having the map area surrounded by at least one road corresponded to the at least one recognized road name in the map service.

In an example of the application, the step of querying the map service with the at least one recognized road name to find the map area in the map service comprises: querying the map service with pairs of the at least one recognized road name to find a plurality of intersections in the map service, and adopting the map area having the intersections as corners in the map service as the map area corresponded to the block area.

In an example of the application, the step of mapping the block area in the picture to the map area in the map service comprises: adjusting a scale and an orientation of the block area to fit the scale and the orientation of the map area in the map service, and pasting the picture of the printed map on the electronic map with the block area aligning to the map area.

In an example of the application, the step of pasting the picture of the printed map on the electronic map comprises: overlapping the picture with the electronic map in an alpha overlaying way.

In an example of the application, after the step of overlapping the picture with the electronic map in the alpha overlaying way, the method further comprises: displaying an alpha value adjusting bar for controlling a transparency of the picture.

In an example of the application, after the step of recognizing the at least one road name related to the road outline, the method further comprises: translating the at least one recognized names into a customized language, and querying the map service with the at least one translated road name to find the electronic map having the map area corresponded to the block area in the map service.

In an example of the application, after the step of mapping the block area in the picture to the map area in the map service, the method further comprises: recognizing at least one point of interest (POI) name in the picture; querying the map service with the at least one POI name; and associating at least one POI corresponded to the at least one POI name in the map area.

In an example of the application, the at least one POI comprises a building, a restaurant, a scenic area, a scenic spot in a scenic are, a hospital, a hotel, a mass transportation station and a school.

An electronic apparatus for recognizing a printed map is introduced herein. The electronic apparatus comprises an input unit, an output unit, a memory and a processing unit. The input unit receives data. The output unit presents the data. The memory stores information comprising program routines. The processing unit is coupled to the input device, the output device and the memory for controlling the execution of the program routines. The program routines comprise a picture capturing module, a picture processing module, a querying module and a mapping module. The picture capturing module obtains a picture of the printed map. The picture processing module defines a block area surrounded by a road outline in the picture, and recognizes at least one road name related to the road outline. The querying module queries a map service with the at least one recognized road name to find an electronic map having a map area corresponded to the block area in the map service. The mapping module maps the block area in the picture to the map area in the map service.

In an example of the application, the picture capturing module captures the picture of the printed map is captured by with an image capturing unit.

In an example of the application, the picture capturing module retrieves the picture of the printed map from a photo gallery.

In an example of the application, picture processing module performs an edge detection on the picture to detect the road outline, and adopts a picture area surrounded by the road outline as the block area.

In an example of the application, the picture processing module performs an optical character recognition (OCR) on at least one character around the road outline to obtain the at least one road name.

In an example of the application, the querying module queries the map service with the at least one recognized road name to find the electronic map having the map area surrounded by at least one road corresponded to the at least one recognized road name in the map service.

In an example of the application, the querying module queries the map service with pairs of the at least one recognized road name to find a plurality of intersections in the map service, and adopts the map area having the intersections as corners in the map service as the map area corresponded to the block area.

In an example of the application, the mapping module adjusts a scale and an orientation of the block area to fit the scale and the orientation of the map area in the map service, and pastes the picture of the printed map on the electronic map with the block area aligning to the map area.

In an example of the application, the mapping module overlaps the picture with the electronic map in an alpha overlaying way.

In an example of the application, the output unit displays an alpha value adjusting bar for controlling a transparency of the picture.

In an example of the application, the processing unit further translates the at least one recognized names into a customized language, and queries the map service with the at least one translated road name to find the electronic map having the map area corresponded to the block area in the map service.

In an example of the application, the picture processing module further recognizes at least one point of interest (POI) name in the picture. The querying module further queries the map service with the at least one POI name. The mapping module associates at least one POI corresponded to the at least one POI name in the map area.

In an example of the application, the at least one POI comprises a building, a restaurant, a scenic area, a scenic spot in a scenic are, a hospital, a hotel, a mass transportation station and a school.

The application provides a computer-readable medium, which records a computer program to be loaded into a mobile device to execute the aforementioned method for recognizing a printed map. The computer program is composed of a plurality of program instructions (for example, an organization chart establishing program instruction, a table approving program instruction, a setting program instruction, and a deployment program instruction, etc), and these program instructions are loaded into a mobile device and executed by the same to accomplish various steps of the method for recognizing a printed map.

The application provides a method for recognizing a printed map, adapted to an electronic apparatus. The method comprises the following steps. First, a picture of the printed map is obtained. Then, a map service is queried to find an electronic map having a map area corresponded to the map on the picture. Afterwards, the map area in the electronic map is mapped to the map on the picture.

The application provides an electronic apparatus for recognizing a printed map. The electronic apparatus comprises an input unit, an output unit, a memory and a processing unit. The input unit receives data. The output unit presents the data. The memory stores information comprising program routines. The processing unit is coupled to the input device, the output device and the memory for controlling the execution of the program routines. The program routines comprise a picture capturing module, a querying module and a mapping module. The picture capturing module obtains a picture of the printed map. The querying module queries a map service to find an electronic map having a map area corresponded to the map on the picture. The mapping module maps the map area in the electronic map to the map on the picture.

Based on the above description, the examples of the present application provide a method and a computer-readable medium for recognizing a printed map. Through a picture of the printed map, the electronic apparatus is able to find the location corresponding to the printed map on the map service after performing some recognizing and querying operations. As a result, the user may use the map service to obtain more detailed information about the printed map.

In order to make the aforementioned and other features and advantages of the application comprehensible, several examples accompanied with figures are described in detail below.

BRIEF DESCRIPTION OF THE DRAWINGS

The accompanying drawings are comprised to provide a further understanding of the application, and are incorporated in and constitute a part of this specification. The drawings illustrate examples of the application and, together with the description, serve to explain the principles of the application.

DETAILED DESCRIPTION OF DISCLOSED EXAMPLES

Some examples of the present application will now be described more fully hereinafter with reference to the accompanying drawings, in which some, but not all examples of the application are shown. Indeed, various examples of the application may be embodied in many different forms and should not be construed as limited to the examples set forth herein; rather, these examples are provided so that this disclosure will satisfy applicable legal requirements. Like reference numerals refer to like elements throughout.

Figure 1:
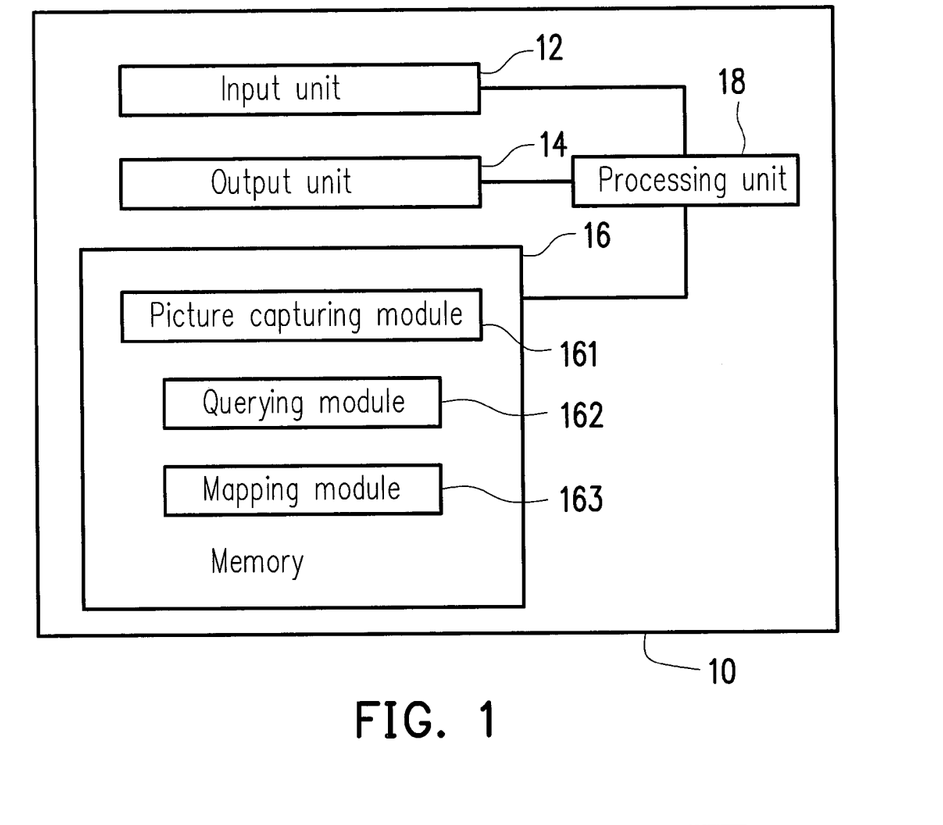
FIG. 1 is a schematic diagram of an electronic apparatus according to an example of the present application.

FIG. 1 is a schematic diagram of an electronic apparatus according to an example of the present application. In the present example, the electronic apparatus 10 comprises an input unit 12, an output unit 14, a memory 16, and a processing unit 18. The input unit 12 receives data. The output unit 14 presents the data. The memory 16 stores information comprising program routines. The processing unit 18 is coupled to the input device 12, the output device 14, and the memory 16 for controlling the execution of the program routines. The program routines comprise a picture capturing module 161, a querying module 162 and a mapping module 163.

Figure 2:
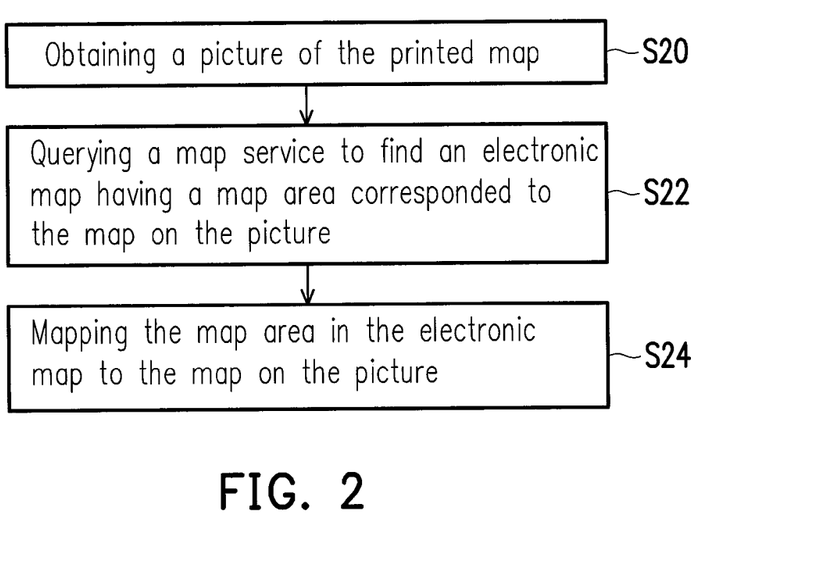
FIG. 2 is a flow chart illustrating a method for recognizing a printed map according to an example of the present application.

FIG. 2 is a flow chart illustrating a method for recognizing a printed map according to an example of the present application. In the present example, the steps illustrated in FIG. 2 may be adapted to the electronic apparatus 0 of FIG. 1, but the application is not limited thereto. Referring to both FIG. 1 and FIG. 2, in step S20, the picture capturing module 161 may obtain a picture of the printed map. For example, the picture capturing module 161 may be configured for retrieving pictures of the printed map from, for example, a photo taken by a camera, photo gallery of the electronic apparatus 10, a cloud server, a web page or the like. The printed map may be any arbitrary map that could be found in, for example, tourist brochures, map guide, or the like. The querying module 162 may query a map service to find an electronic map having a map area corresponded to the map on the picture. In detail, the querying module 162 may firstly recognize the contents of the picture, and then query the map service with the recognizable contents contained in the picture. After the map service has found the objects (e.g., buildings or roads) corresponding to the queried contents, the mapping module 163 may map the map area in the electronic map to the map on the picture.

In other words, the electronic apparatus 10 provided in the present example may find the map area corresponding to the printed map in the electronic map simply with the knowledge of the picture of the printed map. Besides, the electronic apparatus 10 could map the map area in the electronic map to the map on the picture to further clarify the relationship between the map area and the map on the picture. Detailed discussion would be provided in the following statements.

Figure 3:
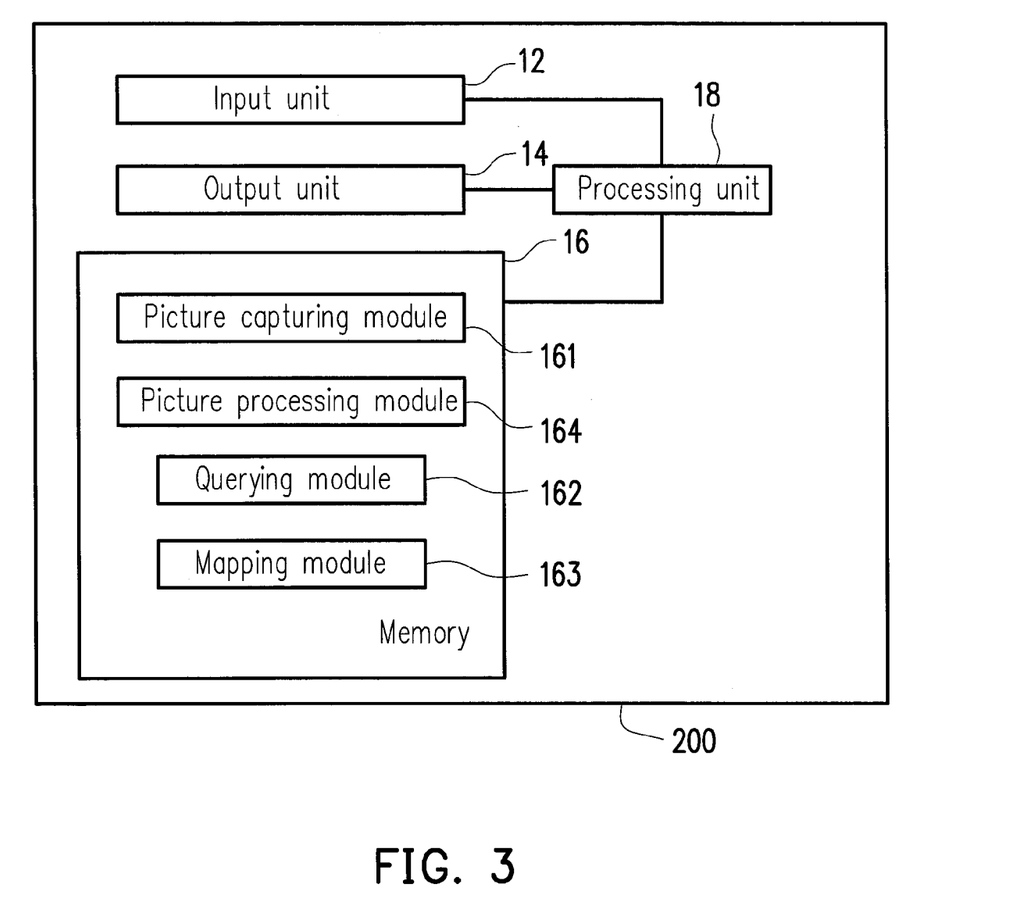
FIG. 3 is a functional diagram illustrating an electronic apparatus according to an example of the present application.
Figure 4:
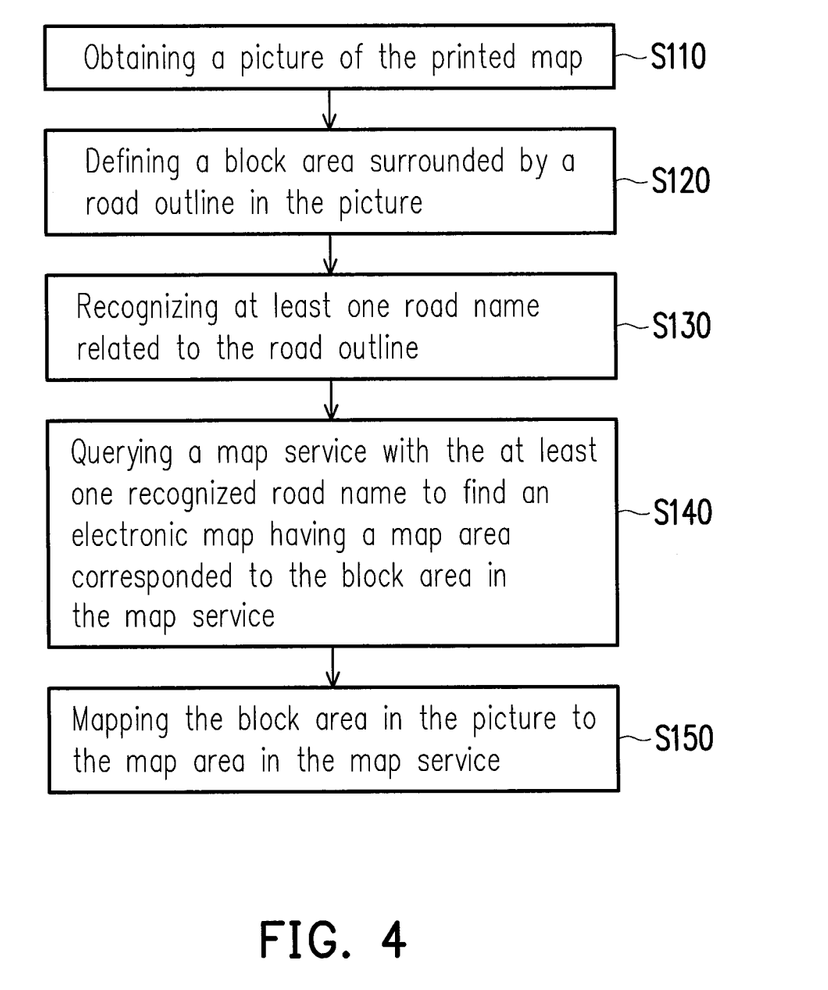
FIG. 4 is a flow chart illustrating a method for recognizing a printed map according to an example of the present application.
Figure 5A:
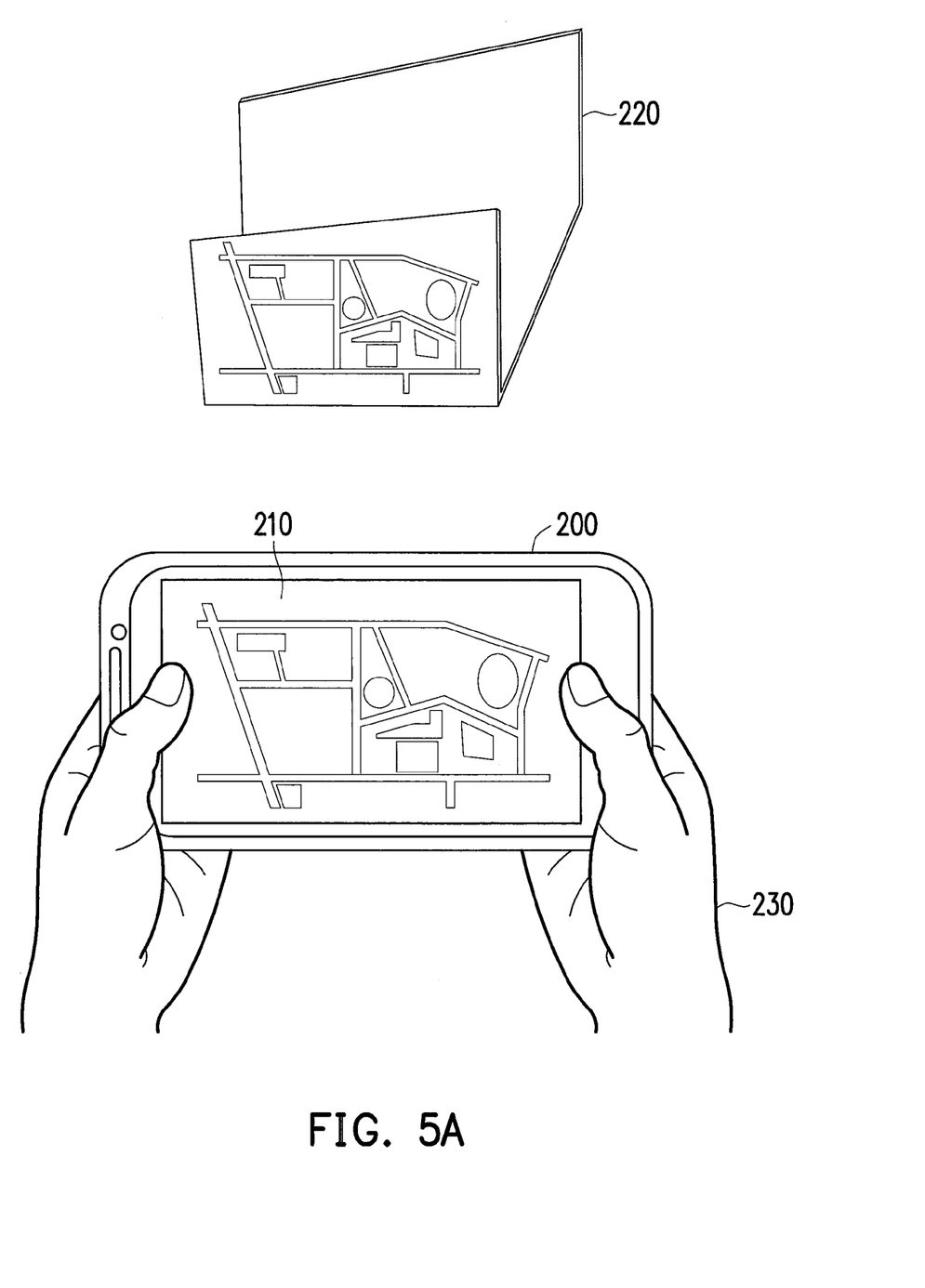
FIG. 5A is a schematic diagram illustrating a method for obtaining a picture of a printed map by using an electronic apparatus according to an example of the present application.

FIG. 3 is a functional diagram illustrating an electronic apparatus according to an example of the present application. In the present example, the electronic apparatus 200 comprises the input unit 12, the output unit 14, the memory 16, and the processing unit 18. The program routines comprised in the memory 16 are a picture capturing module 161, a picture processing module 164, a querying module 162, and a mapping module 163. FIG. 4 is a flow chart illustrating a method for recognizing a printed map according to an example of the present application. FIG. 5A is a schematic diagram illustrating a method for obtaining a picture of a printed map by using an electronic apparatus according to an example of the present application.

Referring to both FIG. 3, FIG. 4, and FIG. 5A, the proposed method for recognizing a printed map is adapted to the electronic apparatus 200, for example a portable electronic device, such as a smartphone, a personal digital assistant (PDA), a tablet or the like, and the application is not limited thereto. The input unit 12 and the output unit 14 may be integrated as a touch display of the electronic apparatus 200. In step S110, the picture capturing module 161 may obtain a picture 210 of a printed map 220 under the operation of a user 230, wherein the printed map may be a map printed on a tourist brochure or posted on an information board. To be specific, when the user 230 is travelling with the printed map 220, the user 230 may not be able to find the way to the destination since the printed map 220 may be a brief map in tourist brochures, or the printed map may be printed in a foreign language unfamiliar to the user 230. At this time, the user 230 may use an image capturing unit, for example a camera, (not shown) of the electronic apparatus 200 to capture the picture 210 of the printed map 220 and the picture capturing module 161 may retrieve the picture 210 from the image capturing unit, so as to recognize the printed map 220 through an on-line map service. In another example, the picture 120 of the printed map 220 may be first saved in a photo gallery or saved in a local memory or a cloud memory. Afterward, the picture capturing module 161 may retrieve the picture 210 from the photo gallery or the memory later, but the application is not limited thereto.

Figure 5B:
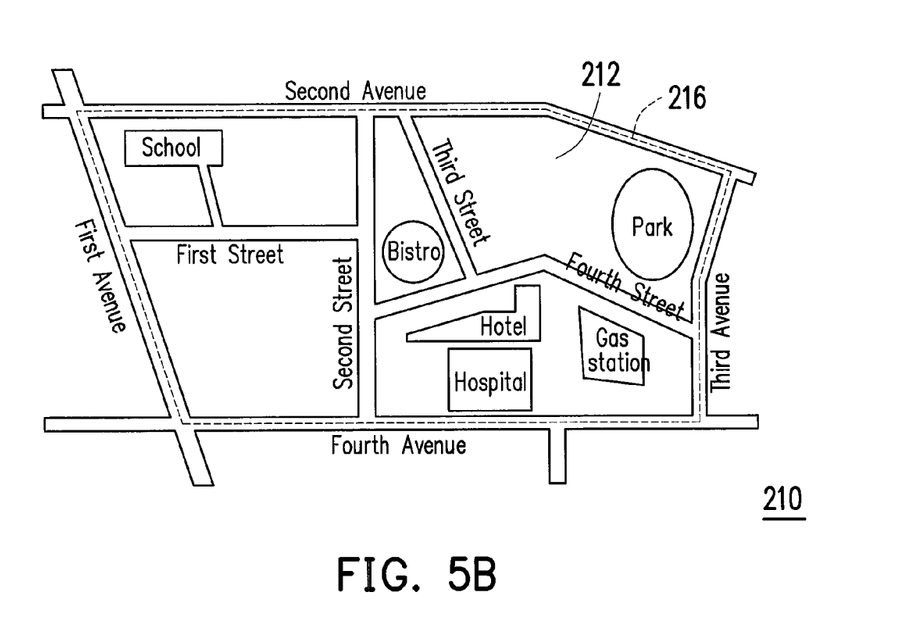
FIG. 5B is a schematic diagram illustrating the picture of the printed map according to an example of the present application.

FIG. 5B is a schematic diagram illustrating the picture of the printed map according to an example of the present application. Through interpreting the picture 210, the picture processing module 164 may define a block area 212 in Step S120, where the block area 212 is surrounded by a road outline 214 in the picture 210. In detail, the picture processing module 164 may perform edge detection on the picture 210 to detect the road outline 214. In the present example, the road outline 214 may comprise the outermost roads in the picture 210, which is not limited thereto. It can be observed that in the picture 210, the outermost roads comprise a First Avenue, a Second Avenue, a Third Avenue, and a Fourth Avenue. After the road outline 214 is defined, the picture processing module 164 may adopt the area surrounded by the road outline 214 as the block area 212.

Next, in step S130, the picture processing module 164 may recognize the road names related to the road outline 214. That is, the picture processing module 164 may recognize the words comprised in or nearby the road outline 214. For example, the picture processing module 164 may perform an optical character recognition (OCR) on the characters on or around the road outline 214 to obtain the words of the road names. Herein, since the arrangement and orientation of the words of the road name will be usually aligned to its corresponding road, the picture processing module 164 may perform the OCR according to the direction of the roads. Taking the First Avenue as an example. It can be observed that the First Avenue is illustrated in an inclined way. After the road outline 214 is defined, the picture processing module 164 may perform the OCR according to the direction of the First Avenue to recognize the words contained in the First Avenue, i.e., "First Avenue". Similarly, after the road outline 214 is defined, the picture processing module 164 may also respectively recognize the words contained in the Second Avenue, the Third Avenue, and the Fourth Avenue, i.e., "Second Avenue", "Third Avenue," and "Fourth Avenue". Further, the picture processing module 164 may respectively store the recognized road names in a specific memory (not shown) for facilitating the following operations.

In step S140, the querying module 162 may query a map service with the recognized road names to find an electronic map having a map area corresponded to the block area 212 in the map service. The map service may be an electronic map that could be used to search for corresponding locations after querying specific key words, for example a map service provided in the electronic apparatus 200 or provided from a map service server, for example a navigation application, Google map, Bing map or the like.

However, if the querying module 162 queries only one of the road name, the corresponding road of the picture 210 may not be able to correctly found since there may exist plenty of roads having the same name at different places. Hence, in some examples, the querying module 162 may simultaneously query the map service with all of the recognized road names. As a result, the map service may use the recognized road names to find the electronic map having the map area surrounded by roads corresponding to the recognized road names. Or, the querying module 162 may respectively query the recognized roads. When one of the recognized road names is queried, the mapping module 163 may mark its corresponding road in the map service by, for example, highlighting the entire road. After all of the recognized road names are queried, the mapping module 163 may further detect the map service to find out whether there exists a map area surrounded by marked roads. At this time, the mapping module 163 may adopt the map area surrounded by the marked roads in the map service as the map area corresponding to the block area 212 of the picture 210.

In other examples, the querying module 162 may query the map service with pairs of the recognized road names to find intersections in the map service. As mentioned before, since the map service may not be able to precisely find the correct road when querying only one road name, the querying module 162 may query two of the recognized road names at once. With the two queried road names, the mapping module 163 may find an intersection constituted by the crossing of the roads corresponding to the two queried road names. Similarly, the mapping module 163 may mark the intersection by, for example, labelling a flag, a pin or the like. Next, the querying module 162 may query the map service with another pair of the recognized road names and mark the corresponding intersection as well. After all of the intersections related to the recognized roads are founded, the mapping module 163 may adopt the map area having the intersections as corners in the map service as the map area corresponding to the block area 212.

Figure 5C:
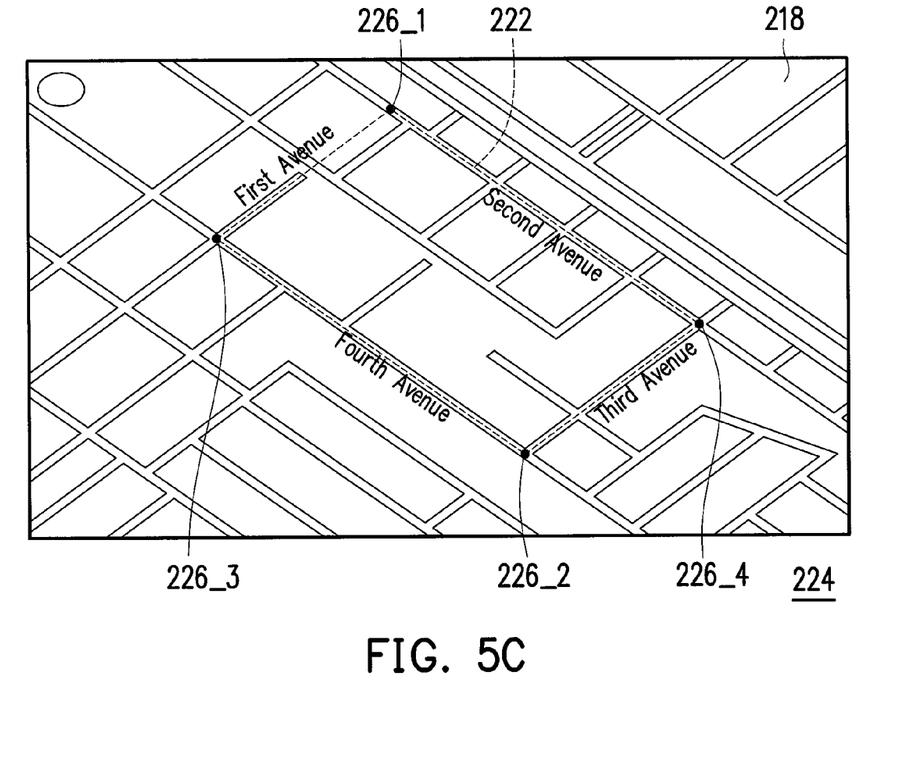
FIG. 5C is a schematic diagram illustrating using a map service to find a map area corresponding to the block area according to an example of the present application.

FIG. 5C is a schematic diagram illustrating a method for finding a map area corresponding to the block area by using a map service according to an example of the present application. Referring to both FIGS. 5B and 5C, the querying module 162 may firstly query the map service with "First Avenue" and "Second Avenue", and mark an intersection 226_1 in the electronic map 218 of the map service 224. Next, the querying module 162 may query the map service with "Third Avenue" and "Fourth Avenue", and mark an intersection 226_2 in the map service 224 as well. Afterwards, intersections 226_3 and 226_4 may also be founded with aforementioned teachings. Hence, the mapping module 163 may adopt the map area 222 as the map area corresponding to the block area 212.

In another example, since a substantially rectangular block may be defined after finding its two diagonal intersections, the mapping module 163 may easily find the map area 222 in the map service 224 with only two intersections. For example, the querying module 162 may firstly query a first pair of the recognized road names, e.g., "First Avenue" and "Second Avenue". Next, the mapping module 163 may highlight the roads related to the founded intersection, i.e., the intersection 226_1. Afterwards, the querying module 162 may query a second pair of the recognized road names, which contains road names different from the first pair of the recognized road names, e.g., "Third Avenue" and "Fourth Avenue". Similarly, the mapping module 163 may highlight the roads related to the founded intersection as well, i.e., the intersection 226_2. At this time, since the highlighted roads related to the two founded intersection (i.e., the intersections 226_1 and 226_2) would be very possible to surround a specific block, the mapping module 163 may define the specific block as the map area 222, which corresponds to the block area 212.

Referring back to FIG. 4, FIG. 5B, and FIG. 5C, in step S150, the mapping module 163 may map the block area 212 in the picture 210 of FIG. 5B to the map area 222 in the map service 224 of FIG. 5C. In detail, since the scale and the orientation of the map area 222 of FIG. 5C and the block area 212 of FIG. 5B are different from each other, the mapping module 163 may adjust the scale and the orientation of the block area 212 to fit the scale and the orientation of the map area 222 in the map service 224, or adjust the scale and the orientation of the block area 222 in the map service 224 to fit the scale and the orientation of the map area 212. For example, the mapping module 163 may firstly detect the directions and the lengths of at least one of the roads in and/or surrounding the map area 222. Next, the mapping module 163 may analyze the directions of at least one of the roads in and/or surrounding the map area 222 to find out the orientation difference between the block area 212 and the map area 222. Afterwards, the mapping module 163 may rotate the block areas 212 or the map area 222 according to the orientation difference.

Besides, the mapping module 163 may adjust the scale of the block areas 212 or the map area 222 according to the lengths of at least one of the roads in and/or surrounding the block area 212 and the map area 222. For example, the mapping module 163 may adjust the length of the First Avenue in FIG. 5B to match the length of the First Avenue in FIG. 5C, i.e., the distance between the intersections 226_1 and 226_2, or adjust the length of the First Avenue in FIG. 5C to match the length of the First Avenue in FIG. 5B. Meanwhile, the mapping module 163 may also perform same operations to the Second Avenue, the Third Avenue, and the Fourth Avenue in FIG. 5B or 5C. As a result, the mapping module 163 would obtain a zoomed image of the picture 210 or the picture 210 with original size and will map to a scaled electronic map further.

In another example, sometimes the proportional scales of different areas of the printed map 220 are different, and therefore, the mapping module 163 needs to adjust the scale of the block areas 212 with different scale ratios for different areas, respectively. For example, the mapping module 163 may adjust the scales of different areas of the block areas 212 according to the lengths of a plurality of the roads in and/or surrounding the block area 212.

Figure 5D:
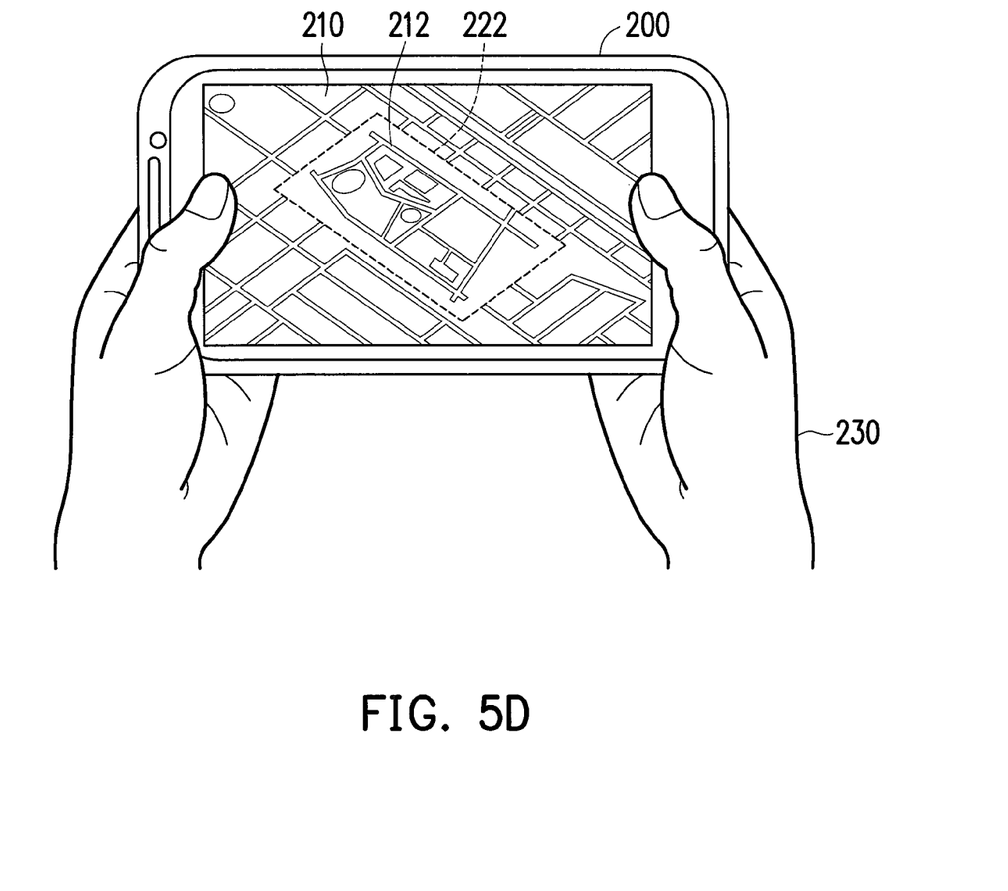
FIG. 5D is a schematic diagram illustrating the map service after mapping the block area to the map area according to an example of the present application.

FIG. 5D is a schematic diagram illustrating the map service after mapping the block area to the map area according to an example of the present application. After the scale and the orientation of the block area 212 of the picture 210 or the map area 222 are adjusted, the mapping module 163 may paste the picture 210 of the printed map 220 on the electronic map 218 with the block area 212 aligning to the map area 222. In some examples, the mapping module 163 may overlap the picture 210 with the electronic map 218 or overlap the electronic map 218 with the picture 210 in an alpha overlaying way, for example, using the picture 210 as a layer overlap on the electronic map 218 or using the web 218 as a layer overlap on the picture 210, wherein the overlapped layer may be a translucent layer. As a result, the user 230 can clearly see the mapping relationship between the block area 212 and the map area 222. Besides, since the printed map 220 may be illustrated in a rough way, the alpha overlaying way of overlapping makes the details of the printed map 220 can be observed in the electronic map 218.

Besides, the touch display of the electronic apparatus 200 may further display an alpha value adjusting bar (not shown) for controlling a transparency of the picture 210 after the picture 210 is overlapped with the electronic map 218. With the alpha value adjusting bar, the user 230 may manually control the transparency of the picture 210. Therefore, when the user 230 only wants to see the electronic map 218, the user 230 may adjust the alpha value adjusting bar the make the picture 210 totally transparent. On the other hand, when the user 230 wants to see the mapping relationship between the block area 212 and the map area 222, the user 230 may adjust the alpha value adjusting bar the make the picture 210 less transparent. In some examples, a menu may be provided for the user to select that only the picture 210, only the electronic map 218, or the electronic map 218 mapping relationship between the block area 212 and the map area 222 will be shown.

As a result, when the user cannot clearly understand the contents of the printed map, the user may simply take a picture of the printed map, and the electronic apparatus would automatically find the map area of the electronic map corresponding to the printed map. Hence, the user could use the default functions of the electronic map to get more information of the printed map. For example, when the user gets lost in a scenic area, he/she may use the navigation function of the electronic map to guide the route to his/her destination in the scenic area. Therefore, a novel, intuitive, convenient, user experience could be established by the provided examples of the present application.

Figure 6:
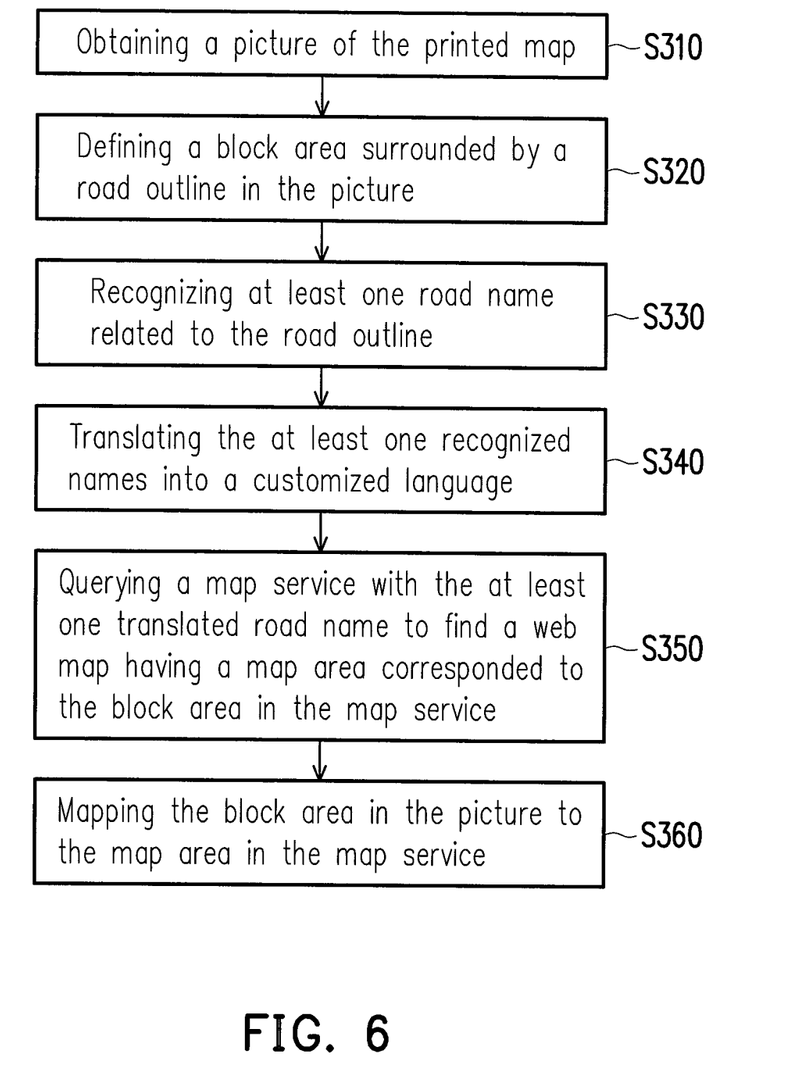
FIG. 6 is a flow chart illustrating a method for recognizing a printed map according to an example of the present application.

FIG. 6 is a flow chart illustrating a method for recognizing a printed map according to an example of the present application. Referring to FIG. 5A-5D and FIG. 6, the proposed method for recognizing a printed map may be adapted to an electronic apparatus 200, but the application is not limited thereto. In the present example, the details of steps S310-S330 may be referred to the descriptions of the steps S110-S130 in FIG. 4, which will not be further described herein. Sometimes the words on the printed map 220 are printed in languages unfamiliar to the user 230. At this time, the processing unit 18 may firstly detect a customized language of the user 230 according to the default language of the electronic apparatus 200. Next, in step S340 the processing unit 18 may translate the language of the recognized road names into the customized language. For example, when an American travels to Taiwan, he/she may not easily acquire maps printed in English. Therefore, after recognizing the road names, the processing unit 18 may further translate the recognized road names into the languages familiar to him/her.

Afterwards, in step S350, the querying module 162 may query the map service 224 with the translated road names to find the electronic map 218 having the map area 222 corresponding to the block area 212 in the map service 224. The details of finding the map area 222 may be referred to the related descriptions of the step S140 in FIG. 4, which would not be described herein. Besides, after the picture 210 being mapped to the electronic map 218, the touch display of the electronic apparatus 200 may display the electronic map 218 in the customized language of the user 230 for facilitating the user to understand the contents related to the printed map 220.

In other examples, the picture processing module 164 may further recognize point of interest (POI) names in the picture 210, such as "School", "Hospital", "Bistro", "Park", "Gas Station", "Hotel", etc. Next, the querying module 162 may query the map service 224 with the POI names to find their corresponding locations in the electronic map 218. Further, the mapping module 163 may associate (e.g., label) POI corresponding to the POI names in the map area, so that the user may directly tap the POI in the picture and check the information of the POI from the map service 224. In another example, sometimes the names of POI in the picture (i.e. the POI show in the original printed map 220) may not be found in the map service 224, then the mapping modules 164 may directly label the POI names in the corresponding locations in the map area. The POI comprises, for example, a building, a restaurant, a scenic area, a scenic spot in a scenic are, a hospital, a hotel, a mass transportation station and a school, but the application is not limited thereto. For example, the mapping module 163 may label the location corresponding to "School" in the electronic map 218.

The application provides a computer-readable medium, which records a computer program to be loaded into an electronic apparatus to execute the steps of the aforementioned method for recognizing a printed map. The computer program is composed of a plurality of program instructions (for example, an organization chart establishing program instruction, a table approving program instruction, a setting program instruction, and a deployment program instruction, etc), and these program instructions are loaded into the electronic apparatus and executed by the same to accomplish various steps of the method for recognizing the printed map.

To sum up, the embodiments and examples of the present application provide a method and an electronic apparatus for recognizing a printed map. With the method, the electronic apparatus may analyze the contents of the printed map after obtaining the picture of the printed map. And, after querying the map service with the contents of the printed map, the electronic apparatus may build a connection between the printed map and the electronic map. Afterwards, the electronic apparatus may directly paste the picture of the printed map to the electronic map so as to facilitate the user to understand the contents of the printed map. Hence, a novel, intuitive, and convenient user experience could be established by the provided examples of the present application.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A method A method for recognizing a printed map, adapted to an electronic apparatus comprising a processing unit, the method comprising: obtaining a picture of the printed map from a photo taken by a camera or from a gallery stored in a memory of the electronic apparatus a cloud server, or a web page by the processing unit;
performing an edge detection on the picture to detect a road outline consisting of the outermost roads in the picture to define a block area in the picture by the processing unit; and
adopting a picture area surrounded by and within the detected road outline as the block area in the picture by the processing unit;
performing an optical character recognition (OCR) on at least one character around the detected road outline to obtain the at least one road name by the processing unit;
querying a map service provided in the electronic apparatus or provided from a map service server with the at least one recognized road name to find an electronic map having a map area corresponded to the block area in the map service; and mapping the block area in the picture to the map area in the map service by the processing unit; wherein after the step of mapping the block area in the picture to the map area in the map service, the method further comprising:

recognizing at least one point of interest (POI) name in the picture; querying the map service with the at least one POI name; determining whether there is a POI in the map area corresponding to the at least one POI name; and in response to determining that there is a POI in the map area corresponding to the at least one POI name, associating the POI in the map area corresponded with the at least one POI name in the map area.

2. The method as claimed in claim 1, wherein the step of querying the map service provided in the electronic apparatus or provided from the map service server with the at least one recognized road name to find the map area in the map service comprises:

querying the map service with pairs of the at least one recognized road name to find a plurality of intersections in the map service; and adopting the map area having the intersections as corners in the map service as the map area corresponded to the block area.

3. The method as claimed in claim 1, wherein the step of mapping the block area in the picture to the map area in the map service comprises:

adjusting a scale and an orientation of the block area to fit the scale and the orientation of the map area in the map service; and pasting the picture of the printed map on the electronic map with the block area aligning to the map area.

4. A non-transitory computer-readable medium, recording program instructions for performing the method as claimed in claim 1.

5. An electronic apparatus for recognizing a printed map, comprising:

an input unit for receiving data; an output unit for presenting the data; and a memory storing information comprising program routines comprising:

a picture capturing module, obtaining a picture of the printed map from a photo taken by a camera or from a gallery stored in a memory of the electronic apparatus, a cloud server, or a web page by the processing unit;

a picture processing module, performing an edge detection on the picture to detect a road outline consisting of the outermost roads in the picture to define a block area in the picture, adopting a picture area surrounded by and within the detected road outline as the block area in the picture, and performing an optical character recognition (OCR) on at least one character around the detected road outline to obtain the at least one road name;

a querying module, querying a map service with the at least one recognized road name to find an electronic map having a map area corresponded to the block area in the map service;

a mapping module, mapping the block area in the picture to the map area in the map service;

wherein the picture processing module further recognizes at least one point of interest (POI) name in the picture; the querying module further queries the map service with the at least one POI name and determines whether there is a POI in the map area corresponding to the at least one POI name; and in response to determining that there is no POI in the map area corresponding to the at least one POI name, the mapping module further labels the at least one POI name at a location corresponding to the at least one POI name in the map area and a processing unit coupled to the input device, the output device and the memory for controlling the execution of the program routines.

6. The electronic apparatus as claimed in claim 5, wherein the querying module queries the map service with pairs of the at least one recognized road name to find a plurality of intersections in the map service, and adopts the map area having the intersections as corners in the map service as the reap area corresponded to the block area.

7. The electronic apparatus as claimed in claim 5, wherein the mapping module adjusts a scale and an orientation of the block area to fit the scale and the orientation of the map area in the map service, and pastes the picture of the printed map on the electronic map with the block area aligning to the map area.

8. The electronic apparatus as claimed in claim 7, wherein the mapping module overlaps the picture with the electronic map in an alpha overlaying way.

9. The electronic apparatus as claimed in claim 8, wherein the output unit displays an alpha value adjusting bar for controlling a transparency of the picture.

10. The electronic apparatus as claimed in claim 5, wherein the processing unit further translates the at least one recognized names into a customized language, and queries the map service with the at least one translated road name to find the electronic map having the map area corresponded to the block area in the map service.

11. The method as claimed in claim 1, wherein the step of mapping the block area in the picture to the map area in the map service by the processing unit comprises:

overlapping the picture with the electronic map in an alpha overlaying way.

12. The method as claimed in claim 11, further comprising:

displaying an alpha value adjusting bar for controlling a transparency of the picture.

13. The method as claimed in claim 1, further comprising:

translating the at least one recognized road names into a customized language, and queries the map service with the at least one translated road name to find the electronic map having the map area corresponded to the block area in the map service.

14. The method as claimed in claim 1, further comprising:

receiving a destination and planning a route to the destination.

15. The method as claimed in claim 1, wherein after the step of mapping the block area in the picture to the map area in the map service, the method further comprising:

recognizing at least one POI name in the picture;

querying the map service with the at least one POI name;

determining whether there is a POI in the map area corresponding to the at least one POI name; and in response to determining that there is no POI in the map area corresponding to the at least one POI name, labelling the at least one POI name at a location corresponding to the at least one POI name in the map area.

16. The method as claimed in claim 15, further comprising:

receiving a tap signal for the labelled POI in the picture; and displaying the information of the labelled POI for the map service.

17. The electronic apparatus as claimed in claim 5, wherein the processing unit further receives a destination and plans a route to the destination.

18. The electronic apparatus as claimed in claim 5, wherein
the picture processing module further recognizes at least one POI name in the picture;
the querying module further queries the map service with the at least one POI name and determine whether there is a POI in the map area corresponding to the at least one POI name; and
in response to determining that there is a POI in the map area corresponding to the at least one POI name, the mapping module further associates the POI in the map area with the at least one POI name.

* * * * *